US012698296B2

(12) United States Patent
Chougule et al.

(10) Patent No.: US 12,698,296 B2
(45) Date of Patent: Aug. 4, 2026

(54) PROCESS FOR PRODUCING A BIPHENYL METALLOCENE COMPLEX

(71) Applicant: SABIC GLOBAL TECHNOLOGIES B.V., Bergen op Zoom (NL)

(72) Inventors: Sambhaji Nanasaheb Chougule, Baroda (IN); Anamitra Chatterjee, Geleen (NL); Jaiprakash Brijlal Sainani, Vadodara (IN); Sivalingam Gunasekaran, Geleen (NL); Bharatkumar Ravjibhai Paghadar, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 900 days.

(21) Appl. No.: 17/916,197

(22) PCT Filed: Apr. 2, 2021

(86) PCT No.: PCT/EP2021/058796

§ 371 (c)(1),
(2) Date: Sep. 30, 2022

(87) PCT Pub. No.: WO2021/198509

PCT Pub. Date: Oct. 7, 2021

(65) Prior Publication Data

US 2023/0151030 A1 May 18, 2023

(30) Foreign Application Priority Data

Apr. 2, 2020 (IN) ............................ 202041014658

(51) Int. Cl.

*C07F 5/02* (2006.01)
*B01J 23/44* (2006.01)
*C07F 17/00* (2006.01)

(52) U.S. Cl.

CPC ............... *C07F 5/025* (2013.01); *B01J 23/44* (2013.01); *C07F 17/00* (2013.01)

(58) Field of Classification Search

USPC ............................................................ 568/3
See application file for complete search history.

(56) References Cited

U.S. PATENT DOCUMENTS 6,342,622 B1 1/2002 Arts et al.

FOREIGN PATENT DOCUMENTS

WO 2016188999 A1 12/2016
WO 2020043815 A1 3/2020

OTHER PUBLICATIONS

Das, A. et al., "9-H-9-Borafluorene Dimethyl Sulphide Adduct: Product of a Unique Ring-Contraction Reaction and a Useful Hydroboration Reagent", Electronic Supplemental Material for Chemical Communications, Jan. 1, 2011; 18 pages.

(Continued)

*Primary Examiner* — Ana Z Muresan
(74) *Attorney, Agent, or Firm* — CANTOR COLBURN LLP

(57) ABSTRACT

The invention relates to a process for preparing a boronic anhydride compound of formula (1), wherein, $R^1$-$R^4$ are substituents as defined in the disclosure and 'B' stands for the element boron. The invention also describes a process of using the boronic anhydride of formula (1), to prepare a biphenyl metallocene complex of formula (4), wherein, $R^1$ to $R^{10}$, are substituents as defined in the disclosure; and wherein 'M' is a transition metal element, 'Q' is an halide anion, and 'P' is the valency of the transition metal element 'M' and indicates the number of halide anion present. In addition, the invention further describes a process of purifying the metallocene complex of formula (4) so as to render the overall metallocene complex synthesis process environmentally sustainable as well as cost effective by minimizing waste effluents.

(1)

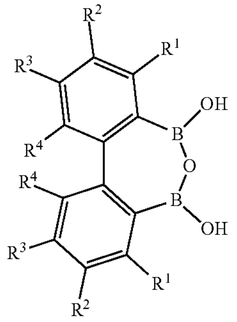

(4)

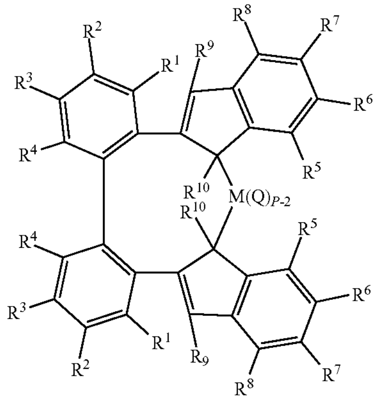

11 Claims, No Drawings

(56) References Cited

OTHER PUBLICATIONS

Ijpeij, E. et al., "A Suzuki Coupling Based Route to 2,2'-Bis(2-indenyl)biphenyl Derivatives", J. Org. Chem., vol. 67, 2002; pp. 169-176.
International Search Report and Written Opinion for the corresponding International Application No. PCT/EP2021/058796, International Filing Date: Apr. 2, 2021; Date of Mailing: Jun. 7, 2021; 17 pages.
Neugebauer, W. et al., "Regioselektive dimetallierung von aromaten. Bequemer zugang zu 2,2'-Disubstituierten Biphenylderivaten", Journal of Organometallic Chemistry, vol. 228, 1982; pp. 107-118.
Schaub, T. et al., "A convenient synthesis of biphenylene", Tetrahedron Letters, vol. 46, 2005; pp. 8195-8197.

PROCESS FOR PRODUCING A BIPHENYL METALLOCENE COMPLEX

CROSS REFERENCE TO RELATED APPLICATIONS

This application is a National Stage application of PCT/EP2021/058796, filed Apr. 2, 2021, which claims the benefit of Indian Application No. 202041014658 filed on Apr. 2, 2020, both of which are incorporated by reference herein in their entirety.

The invention relates to the field of metallocene complexes and in particular to a process suitable for synthesizing biphenyl ligands and their metallocene complexes at high production yield.

Catalyst systems containing metallocene complexes having biphenyl ligands, such as 2, 2'-bis (2-indenyl) biphenyls, have in the past, proven to be suitable for the polymerization of α-olefins. Since, metallocene ligands and complexes are relatively expensive to produce in comparison to traditional polymerization catalysts, such as Ziegler Natta catalysts, a consideration has to be made on using cheaper starting materials/reagents and developing production processes, which can produce metallocene complexes and their intermediate compounds at high production yield while retaining sufficient purity. In particular, the use of biphenyl as a starting material is particularly attractive for producers of metallocene catalysts, as it is relatively cost effective to procure, while providing suitable properties such as stereo specificity, to metallocene catalyst systems.

Typically, as described in U.S. Pat. No. 6,342,622B1, the synthesis route for preparing metallocene complexes involves preparing a mixture of an alkyl lithium compound such as butyl lithium, with a tertiary amine, such as tetramethylethylenediamine (TMEDA). The mixture is prepared by adding TMEDA under ice-bath temperature conditions to butyl lithium. Thereafter, biphenyl compound is added to the mixture to form a di-lithio salt of biphenyl, which in turn is used for preparing boronic anyhydride based ligands and 2, 2'-bis (2-indenyl) biphenyl, both key intermediates for preparing metallocene ligands.

However, such known synthesis routes are fraught with several drawbacks. For instance, the di-lithio salt is highly pyrophoric and difficult to produce at large scale. Further, the yield of production of this di-lithio salt is not consistent and undesired byproducts, such as mono isomer may be formed along with low conversion to the di-lithio salt. In addition, the purification of the di-lithio salt is difficult, requiring multiple washings of hexane or other suitable solvents, to obtain suitable product purity for further reaction. As the yield of the di-lithio salt is low, the overall yield of intermediate products used for metallocene ligand synthesis, which are dependent on the yield and purity of the di-lithio salt, are also low resulting in high cost of production for the metallocene complex. Further, as the overall yield of the metallocene ligand is low, the production of metallocene complex and ligands, result in significant material wastage and generation of toxic effluents, which not only adds to the cost of production and renders the overall production process inefficient, but also adversely impacts environmental and sustainability parameters for industrial scale metallocene catalyst production.

Some of the synthetic routes described in prior publications, although promising, does not completely address some of the drawbacks described above. For example, IJpeij, et al. describes (Journal of Organic Chemistry, 2002, Vol. 67, pages 169-176) a process for bis Suzuki coupling. However, the process described by IJpeij involves high capital and operational costs since the process involves the use of homogeneous catalysts which are difficult to recover from the final product. Further, the process described in U.S. Pat. No. 6,342,622B1, particularly under Example VIII, involves a synthesis protocol, which is difficult to scale up at an industrial production level leading to relatively low product yield along with undesirable material wastage.

Accordingly, due to the foregoing reasons, there remains a need to develop a cost-effective process for the synthesis of metallocene complex with one or more benefits of producing metallocene complex and its intermediate products suitable for industrial scale of production along with high production yield while retaining optimum use of resource and raw materials.

Accordingly, one of the objectives of the present invention, in one aspect of the invention, the invention is directed to a process for producing metallocene complex at high production yield. Another, objective of the present invention is to provide a process for producing boronic anhydride, a key intermediate used in the process of producing metallocene complex, at high production yield. Yet another objective of the present invention, is to provide an environmentally sustainable process for the industrial scale production of metallocene complex and its intermediate compounds with an optimum use of raw materials.

The one or more objectives of the present invention is achieved by providing a process for preparing a boronic anhydride compound of formula (1), (1)

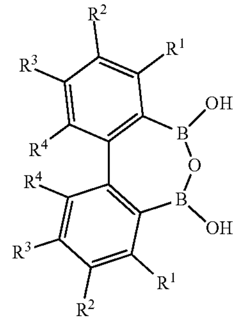

wherein $R^1$, $R^2$, $R^3$, and $R^4$ are each independently selected from hydrogen, a halide, a linear or branched or cyclic hydrocarbyl group having one to twenty carbon atoms independently selected from an alkyl group, an alkenyl group, an aryl group, an alkylaryl group; an alkylsulphide group having one to twenty carbon atoms, an alkoxy group having one to twenty carbon atoms, and an amine group, having one to twenty carbon atoms, an alkoxy group having one to twenty carbon atoms, and an amine group; and 'B' stands for the element boron, comprising the steps of:

a) providing a precursor mixture comprising (i) a biphenyl compound of formula (2), (2)

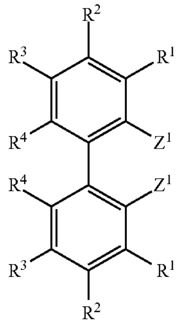

wherein, $R^1$ to $R^4$ are as defined herein, and wherein $Z^1$ is hydrogen, and (ii) a tertiary amine compound;

b) adding, at any temperature between 18° C. to 65° C., alternatively between 21° C. to 45° C., or alternatively between 25° C. to 35° C., an alkyl and/or aryl lithium compound having one to ten carbon atoms, to the precursor mixture and forming a first lithiated reaction product;

c) contacting the first lithiated reaction product with a boronate ester compound of formula (3)

$$B(OR^{11})_3 \quad (3)$$

and obtaining a boronate reaction product; wherein, $R^{11}$ is independently selected from hydrogen, linear or branched or cyclic hydrocarbyl group having one to twenty carbon atoms, independently selected from an alkyl group, an alkenyl group, an aryl group, an alkoxycarbonyl group, an alkylaryl group and one or more combinations thereof; and d) hydrolyzing the boronate reaction product and forming the boronic anhydride compound of formula (1).

In preferred embodiments, of the invention, $R^{11}$ is a methyl group. In some preferred embodiments, $R^1$-$R^4$ are hydrogen. In some embodiments of the invention, the alkyl and/or aryl lithium compound is an alkyl lithium compound having two to eight carbon atoms, and preferably four carbon atoms. In some embodiments of the invention, the alkyl and/or aryl lithium compound is selected from methyl lithium, butyl lithium, phenyl lithium, and preferably the alkyl and/or aryl lithium compound is butyl lithium. In some embodiments of the invention, the first lithiated reaction product is a di-litho salt having the formula:

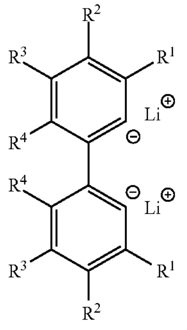

where $R^1$-$R^4$ is as defined in this disclosure. In some preferred embodiments of the invention, the tertiary amine compound is a bidentate tertiary amine, preferably tetramethylethylene diamine (TMEDA). In some embodiments of the invention, the molar ratio of biphenyl to the alkyl and/or aryl lithium compound ranges from 0.5 to 5, preferably 1 to 4, more preferably 2 to 4. In some embodiments of the invention, the molar ratio of biphenyl to the alkyl and/or aryl lithium compound ranges from 0.5 to 5, preferably 1 to 4, or more preferably 2 to 3.

As demonstrated under Example 1, in some preferred embodiments of the invention, the inventive process of producing the boronic anhydride of formula (1) results in nearly 140% improvement in yield compared to the process described in the U.S. Pat. No. 6,342,622B1. The key aspect to be noted in the inventive process for preparing the boronic anhydride, is the sequence of addition of the reactants, where the alkyl and/or aryl lithium compound is added to the precursor mixture comprising the biphenyl compound of formula (2) and the tertiary amine compound, at a suitable temperature between 18° C. to 65° C. On the contrary, the U.S. Pat. No. 6,342,622B1 describes a process, in which tertiary amine compound is first added to the alkyl and/or aryl lithium compound under ice bath condition and thereafter to the mixture so formed, biphenyl is added. Without wishing to be bound by any specific theory, it is suspected that the sequence of addition and mixing of the reactants as described in the present invention, ensures minimal moisture contamination by removing any moisture present in the reactants and the alkyl and/or aryl lithium compound, resulting in high conversion of the biphenyl compound to the lithiated reaction product and subsequently leading to high yield of production of the boronic anhydride of formula (1). Further, the inventive process of synthesizing boronic anhydride, enables a skilled person to conduct the synthesis process at ambient temperature, such as room temperature conditions of 20° C.-25° C., instead of the low temperature or ice-bath temperature conditions, described in U.S. Pat. No. 6,342,622B1, which would require special capital intensive equipment and apparatus to effect such temperature conditions at an industrial scale of production.

In some aspects of the invention, the invention relates to the use of the boronic anhydride of formula (1), to prepare a biphenyl metallocene complex at high production yield. In some aspects of the invention, the invention further relates to a process comprising the steps of preparing a reaction mixture comprising a metallocene complex of formula (4):

(4)

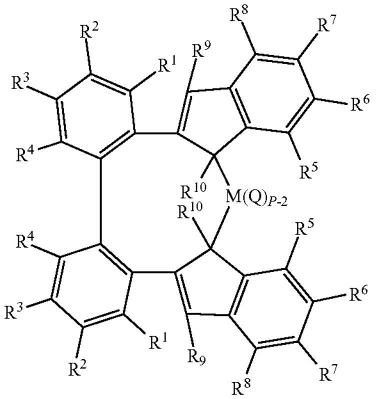

wherein, $R^1$ to $R^4$, are as defined herein in this disclosure, and $R^5$, $R^6$, $R^7$, $R^8$, $R^9$ and $R^{10}$ are each independently selected from hydrogen, a halide, a linear or branched or cyclic hydrocarbyl group having one to twenty carbon atoms, independently selected from an alkyl group, an alkenyl group, an aryl group, an alkylaryl group; an alkylsulphide group having one to twenty carbon atoms, preferably having one to ten carbon atoms, an alkoxy group having one to twenty carbon atoms, preferably having one to ten carbon atoms, and an amine group, and one or more combinations thereof; and wherein 'M' is a transition metal element selected from Group 3, 4, 5 of the Periodic System of Elements, 'Q' is an halide anion, preferably a chloride anion, and 'P' is the valency of the transition metal element 'M' and indicates the number of halide anion present, comprising the steps of:

a) reacting in the presence of a palladium catalyst, the boronic anhydride of formula (1), with a 2-bromo indenyl compound of formula (6),

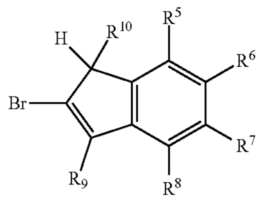

wherein, $R^5$ to $R^{10}$ are as defined in this disclosure, and forming a metallocene complex precursor of formula (7);

(7)

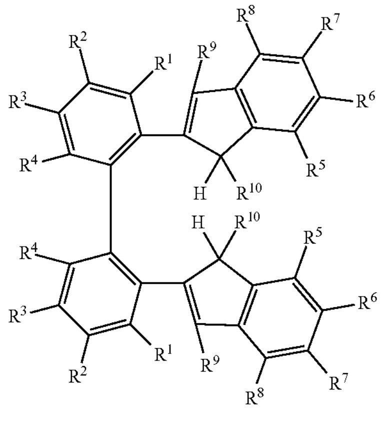

wherein, $R^1$ to $R^{10}$ are as defined herein, b) reacting the metallocene complex precursor of formula (7), with the alkyl and/or aryl lithium compound having one to ten carbon atoms, and forming a second lithiated reaction product; and c) reacting for a time period ranging from 4 to 10 hours, preferably 5 to 8 hours, the second lithiated reaction product, with a transition metal compound of formula (8), $$MQ_p \quad (8)$$

and forming the reaction mixture comprising the metallocene complex of formula (4); wherein 'M' is a transition metal element selected from Group 3, 4, 5 of the Periodic System of Elements, 'Q' is an halide anion, preferably chloride anion, and 'P' is the valency of the transition metal element 'M' and indicates the number of halide anion.

Advantageously, the inventive process of the present invention, enables a skilled person to conduct the reaction between second lithiated reaction product and the transition metal compound ($MQ_p$) at a reduced time period compared to the process described in the U.S. Pat. No. 6,342,622B1. As evidenced by the results from Example 3, the time period of reaction as described by the present invention is particularly suitable for maximizing the conversion yield to obtain the metallocene complex of formula (4). As a result, the inventive process is rendered efficient and is suitable for large scale industrial application. In one aspect of the invention, the second lithiated reaction product has a structure as shown below:

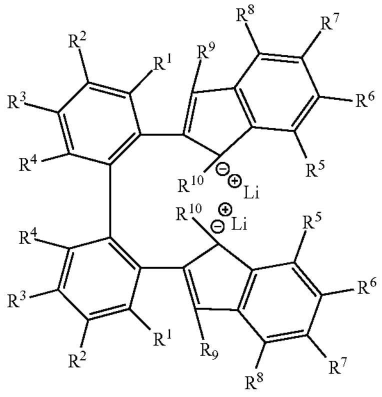

In some embodiments of the invention, the alkyl and/or aryl lithium compound is an alkyl lithium compound having two to eight carbon atoms, and preferably four carbon atoms. In some embodiments of the invention, the alkyl and/or aryl lithium compound is selected from methyl lithium, butyl lithium, phenyl lithium, preferably the alkyl and/or aryl lithium compound is butyl lithium. In some aspects of the invention, the palladium catalyst is selected from tetrakis(triphenylphosphine) ($Pd(PPh_3)_4$), $Pd(OAc)_2$, $Pd_2(dba)_3$, $PdCl_2$, $PdCl_2(PPh_3)_2$. In some preferred embodiments of the invention, the palladium catalyst is tetrakis (triphenylphosphine) ($Pd(PPh_3)_4$).

In some embodiments of the invention, the transition metal element 'M' is selected from zirconium, hafnium, titanium, preferably the transition metal element 'M' is zirconium. In some embodiments of the invention, the transition metal compound ($MQ_p$) of formula (8) is zirconium tetrachloride ($ZrCl_4$).

The reaction mixture contains the desired metallocene complex of formula (4) along with a mix of products, which are regarded as impurities and require to be separated from the reaction mixture to obtain a purified metallocene complex of formula (4a), which is suitable to be used in a catalyst system. In some aspects of the invention, the reaction mixture comprising the metallocene complex of formula (4) is further purified using solvent extraction and filtration, to obtain:

(i) a purified metallocene complex of formula (4a), (4a)

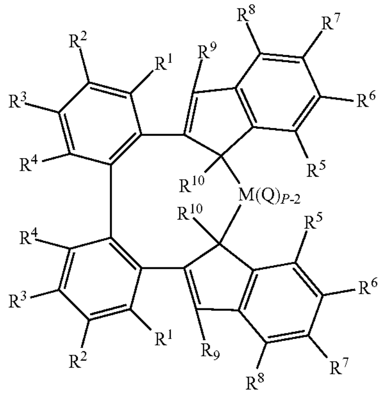

wherein, $R^1$ to $R^{10}$, 'M', 'Q' and 'P' are as defined in this disclosure; and (ii) a product effluent, comprising a mixture of metallocene complex of formula (4a), metallocene complex precursor of formula (7), partially complexed metallocene complex, and lithium based inorganic salts.

In some embodiments of the invention, the purification/ligand recovery process involves the steps of: (a) dissolving the reaction mixture comprising the metallocene complex of formula (4) in an organic solvent selected from dicholorodimethane, toluene, pentane, acetonitrile, hexane or preferably dicholorodimethane, at a temperature ranging from 18° C. to 1100C, preferably at a temperature ranging from 25° C. to 35° C., to obtain a suspension, (b) filtering the suspension and obtaining a first filtrate, (c) concentrating the filtrate under mild heating and obtaining a precipitate, (d) filtering the precipitate to obtain a solid residue product and a second filtrate, (e) washing the solid residue product with an organic solvent followed by filtering and obtaining the purified metallocene complex of formula (4a) and a third filtrate, and (f) mixing the second filtrate and the third filtrate and forming the product effluent. In one aspect of the invention, the purity of the metallocene complex of formula (4a) ranges from, 95%-99.5 wt. %, preferably 98%-99.5 wt. %, with regard to the total weight of the metallocene complex of formula (4a). For the purposes, of the present invention, the purity may be determined using any of the known spectroscopic techniques such as a $^1H$ NMR spectroscopy. Although the above purification/ligand recovery process has been shown to be used with the present inventive process, the purification/ligand recovery process described herein may be used for any biphenyl system which is used for metallocene complex preparation.

In some aspects of the invention, the product effluent is recycled for preparing the reaction mixture, comprising the metallocene complex of formula (4)

In some embodiments of the invention, the product effluent is distilled to remove the solvent and other volatiles and subsequently the solid mass so obtained is further treated with methanolic hydrochloric acid, to obtain the metallocene complex precursor of formula (7).

As may be appreciated by a person skilled in the art, the method of purification of the metallocene complex (4), enables a skilled person to obtain the purified metallocene complex (4a) at high purity, while allowing effluents generated to be recycled back to generate the metallocene complex precursor of formula (7), which in turn is used for the synthesis of the metallocene complex of formula (4) resulting in improvement of the overall yield of production of the metallocene complex (4a) with high purity while the mitigating the generation of toxic effluents. As may be appreciated by a person skilled in the art, the method of purification of the metallocene complex of formula (4) described by way of the present invention, enables the purification to be conducted at a relatively lower temperature than that described in U.S. Pat. No. 6,342,622B1, which describes the use of heated volatile solvents such as boiling toluene to carry out the purification. As a result, the present inventive process can be scaled up for large scale industrial application, while ensuring operational safety and risk.

In some aspects of the invention, the invention is directed to a process comprising one or more steps, preferably in this order, comprising:

a) providing a precursor mixture comprising (i) a biphenyl compound of formula (2) wherein, $R^1$, $R^2$, $R^3$, and $R^4$ are each independently selected from hydrogen, a halide, a linear or branched or cyclic hydrocarbyl group having one to twenty carbon atoms independently selected from an alkyl group, an alkenyl group, an aryl group, an alkoxycarbonyl group, an alkylaryl group; an alkylsulphide group having one to twenty carbon atoms, an alkoxy group having one to twenty carbon atoms, an amine group, and combinations thereof; and wherein $Z^1$ is hydrogen; and
(ii) a tertiary amine compound;

and/or b) adding at any temperature between 18° C. to 65° C., alternatively between 21° C. to 45° C., or alternatively between 25° C. to 35° C., an alkyl and/or aryl lithium compound having one to ten carbon atoms, to the precursor mixture and forming a first lithiated reaction product;

and/or c) contacting the first lithiated reaction product with a boronate ester compound of formula (3)

$$B(OR^{11})_3 \quad (3)$$

and obtaining a boronate reaction product; wherein $R^{11}$ is independently selected from hydrogen, linear, branched or cyclic hydrocarbyl group having one to twenty carbon atoms, independently selected from an alkyl group, an alkenyl group, an aryl group, an alkoxycarbonyl group, or an alkylaryl group, and one or more combinations thereof;

and/or d) hydrolyzing the boronate reaction product and forming the boronic anhydride compound of formula (1);

and/or e) reacting the boronic anhydride compound of formula (1) with a 2-bromo indenyl of formula (6), in the presence of a palladium catalyst and forming a metallocene complex precursor of formula (7);

and/or f) reacting the metallocene complex precursor of formula (7) with the alkyl and/or aryl lithium compound having one to ten carbon atoms, and forming a second lithiated reaction product;

and/or g) reacting for a time period ranging from 4 to 10 hours, preferably 5 to 8 hours, the second lithiated reaction product with a transition metal compound of formula (8), $$MQ_p \quad (8)$$

wherein, 'M' is a transition metal element selected from Group 3, 4, 5 of the Periodic System of Elements, 'Q' is an halide anion, and 'P' is the valency of the transition metal element 'M' and indicates the number of halide anion present, and forming a reaction mixture comprising a metallocene complex of formula (4);

and/or h) purifying the reaction mixture comprising the metallocene complex of formula (4), using solvent extraction and filtration, and obtaining (i) a purified metallocene ligand of formula (4a), and (ii) a product effluent comprising a mixture of metallocene complex of formula 4a, metallocene complex precursor of formula 7, partially complexed metallocene complex, and lithium based inorganic salts.

In some aspects of the invention, the invention is directed to a process comprising the steps of, preferably in this order:

a) providing a precursor mixture comprising (i) a biphenyl compound of formula (2) wherein, $R^1$, $R^2$, $R^3$, and $R^4$ are each independently selected from hydrogen, a halide, a linear or branched or cyclic hydrocarbyl group having one to twenty carbon atoms independently selected from an alkyl group, an alkenyl group, an aryl group, an alkoxycarbonyl group, an alkylaryl group; an alkylsulphide group having one to twenty carbon atoms, an alkoxy group having one to twenty carbon atoms, an amine group, and combinations thereof; and wherein $Z^1$ is hydrogen; and (ii) a tertiary amine compound;

b) adding at any temperature between 18° C. to 65° C., alternatively between 21° C. to 45° C., or alternatively between 25° C. to 35° C., an alkyl and/or aryl lithium compound having one to ten carbon atoms, to the precursor mixture and forming a first lithiated reaction product;

c) contacting the first lithiated reaction product with a boronate ester compound of formula (3)

$$B(OR^{11})_3 \quad (3)$$

and obtaining a boronate reaction product; wherein $R^{11}$ is independently selected from hydrogen, linear, branched or cyclic hydrocarbyl group having one to twenty carbon atoms, independently selected from an alkyl group, an alkenyl group, an aryl group, an alkoxycarbonyl group, or an alkylaryl group, and one or more combinations thereof;

d) hydrolyzing the boronate reaction product and forming the boronic anhydride compound of formula (1); reacting the boronic anhydride compound of formula (1) with a 2-bromo indenyl of formula (6), in the presence of a palladium catalyst and forming a metallocene complex precursor of formula (7);

e) reacting the metallocene complex precursor of formula (7) with the alkyl and/or aryl lithium compound having one to ten carbon atoms, and forming a second lithiated reaction product;

f) reacting for a time period ranging from 4 to 10 hours, preferably 5 to 8 hours, the second lithiated reaction product with a transition metal compound of formula (8), $$(MQ_p) \quad (8)$$

wherein, 'M' is a transition metal element selected from Group 3, 4, 5 of the Periodic System of Elements, 'Q' is an halide anion, and 'P' is the valency of the transition metal element 'M' and indicates the number of halide anion present, and forming a reaction mixture comprising a metallocene complex of formula (4);

g) purifying the reaction mixture comprising the metallocene complex of formula (4), using solvent extraction and filtration, and obtaining (i) a purified metallocene ligand of formula (4a), and (ii) a product effluent comprising a mixture of metallocene complex of formula 4a, metallocene complex precursor of formula 7, partially complexed metallocene complex, and lithium based inorganic salts.

In some aspects of the invention, the invention is directed to the use of the inventive process to improve the yield of production of a metallocene complex. In some aspects of the invention, the invention is directed to the use of the inventive process to improve the purity of a metallocene complex. In one aspect of the invention, the metallocene complex so obtained is combine with a donor and an activator to prepare a metallocene catalyst suitable for the polymerization of olefins. As is evident, the present invention now enables a skilled artisan to use the inventive process for preparing a high purity metallocene complex at high production yield and at an industrial scale while minimizing discharge of harmful effluents and byproducts.

Specific examples demonstrating some of the embodiments of the invention are included below. The examples are for illustrative purposes only and are not intended to limit the invention. It should be understood that the embodiments and the aspects disclosed herein are not mutually exclusive and such aspects and embodiments can be combined in any way.

EXAMPLE 1

Purpose: To prepare a boronic anhydride compound of formula (1) (1, 1'-biphenyl-2, 2'-diyldiboronic anhydride) and compare the yield of production with that described in the reference U.S. Pat. No. 6,342,622B1. The general reaction scheme as practiced for Example 1 is shown below:

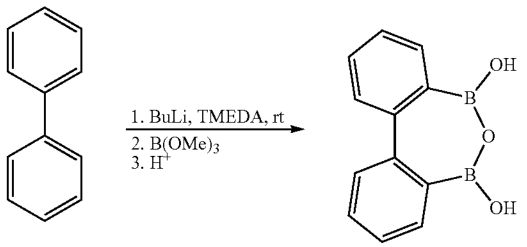

Reactants used: For the purpose of Example 1 the following reactants were used:

TABLE 1

| Reactants | | |
|---|---|---|
| Reactant | Chemical | Supplier |
| Biphenyl | Biphenyl | Aldrich |
| Alkyl Lithium | n-Butyl Lithium | Aldrich |
| Tertiary Amine Compound | TMEDA | Aldrich |
| Boronate ester compound | Trimethyl borate | Aldrich |

Process of synthesis: A biphenyl compound (25 g, 0.16 mole) charged under inert atmosphere, was added to a three neck flask, in the presence of dry hexane (100 ml). To this reaction mixture, TMEDA (60.8 ml, 0.40 mole) was added through a funnel at room temperature (~25° C.). It was observed that the reaction mixture turned into a clear solution after complete addition of TMEDA. The mixture was stirred for 20 minutes at room temperature to form the precursor mixture. Thereafter, alkyl lithium compound, n-BuLi (243 ml, 0.38 mole; 1.6 M solution in hexane) was added through a cannula under inert atmosphere for over a 20 minute duration.

The color of reaction mixture thereafter changed from pale yellow to orange to crimson red and the temperature was increased from 24° C. to 35° C. Thereafter the reaction mixture was heated to 50-52° C. for one hour and subsequently cooled to room temperature. After stirring at room temperature for one hour, 500 ml of hexane was added to the reaction mixture and the temperature was cooled to −50° C. [1 hr.] and settled [0.5 hr.] to precipitate out orange crystals of 2, 2'dilithio biphenyl.bis TMEDA adduct (first lithiated reaction product) and the residual liquor was siphoned off through the cannula.

Finally to the 2, 2'dilithiobiphenyl.bis TMEDA adduct (first lithiated reaction product), which was left in the flask in the form of a solid, was charged with 250 ml tetrahydrofuran and was followed by dropwise addition of trimethyl borate (51.5 ml, 0.464 mole) (boronate ester compound) under a temperature condition of −50° C. The resultant reaction mixture was stirred at room temperature for an hour followed by the addition of dilute hydrochloric acid (10%, until pH reaches −1.5) under a temperature condition of 0° C. followed by stirring over 1 hour at room temperature. It was observed that the layers were separated, organic layer was washed with brine solution and subsequently dried over anhydrous sodium sulphate and concentrated to get the crude desired product. The crude residue was crystallized from toluene and hexane to obtain the biphenyl boronic anhydride compound.

Comparative Example: Procedure of Synthesis (Example 1A): The procedure practiced was as described in the U.S. Pat. No. 6,342,622B1 under Example VIII and the reported results were compared with the results obtained from the practice of Example 1.

Results: Table 2 below provides a detail comparison between the production yield of the results obtained from inventive Example 1 and comparative Example 1A. The amount of product formed was determined using a standard $^{1}H$-NMR spectroscopic technique such as a BRUKER 300 MHz instrument was used for recording the spectra and $CDCl_3$ was used as solvent.

TABLE 2

Product results

| | Weight of biphenyl (g) | Weight of boronic anhydride/boronic acid based product obtained (g) | Yield % |
|---|---|---|---|
| Example 1 | 25 (0.16) | 20 (0.09) | 55% |
| Example 1A | 103 (0.67 mol) | 37.68 (0.15 mol) | 23% |

As is evident, the product yield obtained by the practice of the present invention is significantly higher (~140% higher) than that obtained from the comparative Example 1A. From the experimental section it may be noted that the process practiced in the inventive Example 1 has a lesser reaction time over the reaction time described in Example 1A, thereby making the inventive process more efficient and suitable for industrial scale production.

EXAMPLE 2

Purpose: To prepare a metallocene complex of formula (4a) (2, 2'-bis (2-indenyl) biphenyl zirconium dichloride complex) from the boronic anhydride compound of formula (1) obtained from Example 1, and compare the yield of production so obtained from the practice of Example 2 with that described by the reference U.S. Pat. No. 6,342,622B1. The general reaction scheme as practiced for Example 2 is shown below:

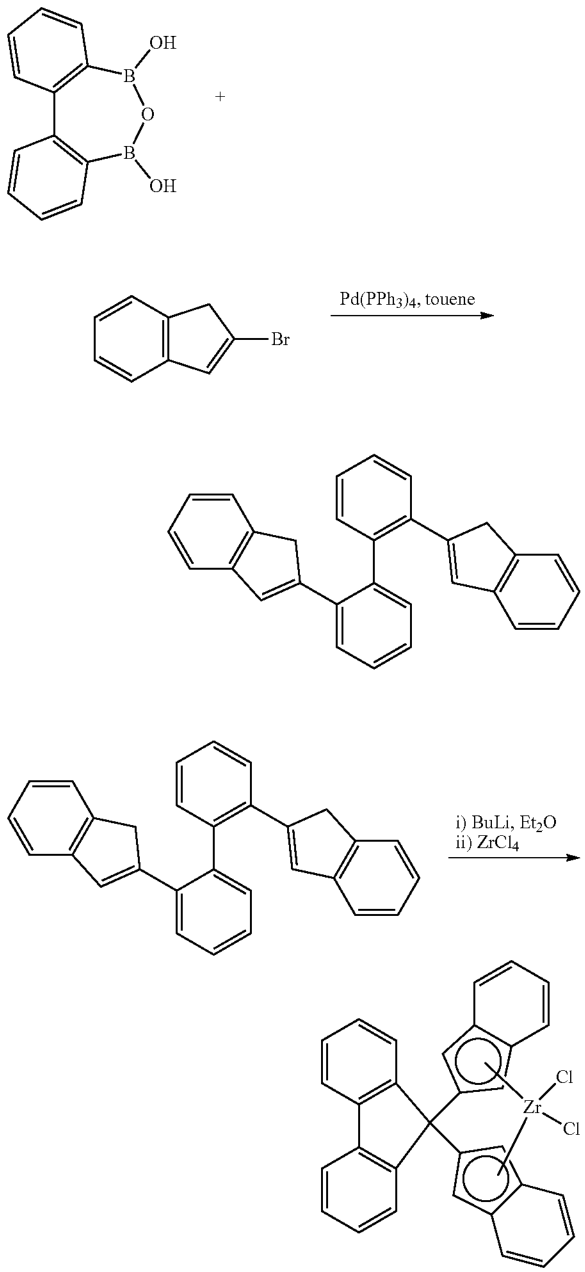

Reactants used: For the purpose of Example 2 the following reactants were used:

TABLE 3

| Reactants | | |
|---|---|---|
| Reactant | Chemical | Supplier |
| 2-Bromo-Indenyl compounds | 2-Bromoindene | Prepared in-house |
| Palladium Catalyst | Palladium-tetrakis(triphenylphosphine) ($Pd(PPh_3)_4$) | Aldrich |

Process of synthesis of 2-Bromoindene: To a mixture of indene (200 mmol), distilled water (15 ml) and dimethyl sulfoxide (70 ml) was added portion wise an amount of 210 mmol of N-bromosuccinimide. The resulting orange solution was stirred for 10 hours at room temperature, hydrolyzed with chilled water (100 ml), and extracted with diethyl ether (3×100 ml). The combined extracts were dried with magnesium sulphate and concentrated to give crystals of 2-bromoindan-1-ol upon standing overnight at −24° C. The obtained 2-bromoindan-1-ol (120 mmol) was suspended in 100 ml of toluene and mixed with a catalytic amount of para-toluenesulfonic acid monohydrate. The mixture was heated at reflux for 12 hours, and water was removed by a Dean-Stark apparatus. The resulting dark brown suspension was filtered and the volatiles were removed under vacuum. The residue was passed through silica gel using pentane as eluent, then the solvent was evaporated, and the crude product was distilled in vacuum. 2-Bromoindene was finally obtained as yellow crystals in 55% yield.

Process of synthesis of metallocene complex: To a solution of tetra(n-butyl)ammonium hydroxide (191.25 ml, 1M in methanol) the following reagents were added: toluene (150 ml), 2-Bromoindene (24.68 gm), 2,2'-Biphenyldiboronic anhydride (15.0 g) (boronic anhydride compound obtained from Example 1) and palladium catalyst [$Pd(PPh_3)_4$] (0.765 g) and the resultant reaction mixture was heated to reflux. At the boiling point, the colour of the reaction mixture changed from deep blue to dark brown, and the product immediately started to precipitate. The reaction mixture was thereafter maintained at this temperature for six hours and then cooled to room temperature. Subsequently, dilute hydrochloric acid (10%, 130 ml) was added at a temperature between 5° C.-10° C. Thereafter, the reaction mixture was filtered, washed with water, methanol (50 ml), followed by a washing with hexane (40 ml). The filtrate comprising hexane and methanol washings were combined and the mixture of solvents so obtained, was removed by rotary evaporator. To the residue that was left, methanol was added followed by cooling to 10° C. A precipitated product of 2,2'-bis(2-indenyl)biphenyl (metallocene complex precursor) was obtained, which was subsequently filtered off and washed with cold methanol and hexane. The dry weight of the compound so obtained was ~15 gm.

A suspension of 2,2'-bis(2-indenyl)biphenyl (15 g) (metallocene complex precursor) was added to dry diethyl ether (600 ml) under nitrogen atmosphere and was subsequently cooled to 0° C. under ice bath condition to obtain a suspension. To this suspension, a solution of n-butyl lithium (alkyl lithium compound) (55 ml, mole 1.6M in hexane) was added. After the addition, solution so obtained, was allowed to warm to room temperature and thereafter was maintained at this temperature for 4 hours and subsequently cooled to −78° C. to obtain the second lithiated reaction product.

Thereafter, zirconium tetrachloride (10.5 g) was added to the second lithiated reaction product. The reaction mixture was allowed to warm to room temperature and the temperature was maintained for six hours compared to previous synthetic protocols which required a longer time period. Subsequently, the crude reaction mixture was filtered and the product (crude metallocene complex of formula 4) was obtained which was further purified.

For the purification, the crude product as obtained from the above process (crude metallocene complex of formula 4) was taken in to dichloromethane (600 mL) and stirred for 15 minutes at room temperature to obtain a suspension. Then the suspension was passed through a celite bed and concentrated to 75% of its volume. The solid was filtered (to obtain first filtrate) and then refluxed with hexane for 30 min, and finally filtered a solid product and a filtrate (second filtrate). A solid product was left behind, which was dried with vacuum to obtain the desired 2, 2'-bi (2-indenyl) biphenyl zirconium dichloride (~11 g) (Pure metallocene complex of formula 4a).

Ligand recovery/purification from product effluent (one cycle of recovery): Filtrates and washings (first filtrate and second filtrate) so obtained (product effluent) during purification of crude 2, 2'-bi (2-indenyl) biphenyl zirconium dichloride (crude metallocene complex of formula 4) were collected. Evaporation of the volatiles provided 9 g tarry dark brown material. Further treatments were conducted following a method as described below: The residue (9 g) was stirred vigorously as a suspension in a methanolic HCl solution (200 mL, 6M, prepared by adding aqueous 12M HCl in methanol) overnight. The precipitated solid was filtered and was washed with copious amounts of water. A final wash was given with methanol and was subsequently dried under water suction. $^1H$ NMR analysis showed sufficient purity of this compound. 4 g (53%) of ligand (metallocene precursor) was obtained in this method. $^1H$ NMR ($CDC_3$): δ 7.41-7.09 (m, 16H), 6.32 (s, 2H), 3.35 (d, J=28.5 Hz, 2H), 3.14 (d, J=28.5 Hz, 2H).

Comparative Example: Procedure (Example 2A): The procedure practiced was as described in the U.S. Pat. No. 6,342,622B1 under Example VIII.

Results: Table 2 below provides a detail comparison between the production yield between Example 2 and comparative Example 2A. The amount of product formed was determined using a standard $^1H$-NMR spectroscopic technique.

TABLE 4

| Yield obtained for metallocene complex precursor | | | |
|---|---|---|---|
| | Weight of 2,2'-biphenylboronic acid/anhydride (g) | Weight of 2,2'-bis(2-indenyl) biphenyl (g) (7) | Yield % (I) of 2,2'-bis(2-indenyl) biphenyl (g) (7) |
| Example 2 | 15.3 g (0.066 mol) | 15 g (0.039 mol) | 59% |
| Example 2A | 12.2 g (0.045 mol) | 5.98 g (15.6 mmol) | 35% |

TABLE 5

| Overall Yield of metallocene complex of formula (4) and formula (4)a | | | | |
|---|---|---|---|---|
| | Weight of 2,2'-bis(2-indenyl) biphenyl (g) (7) | Weight of 2, 2'-bis (2-indenyl) biphenyl zirconium dichloride complex (g) (4a) | Purified Metallocene complex of formula 4a Yield % (II) | Overall Yield % (starting from boronic anhydride/acid including ligand recovery step) |
| Example 2 | 15 g (0.039 mol) | 11 g (0.020 mol) | 51% | 30% |
| Example 2 (with one cycle of ligand recovery and purification) | | 13.55 g (0.025 mol) | 64% | 38% |
| Example 2A | 3.84 g (0.01 mol) | 3.95 g (0.007 mol) | 70% | 24% |

As is evident, that the overall product yield obtained by the practice of the present invention is significantly higher (~58% higher than the process described in U.S. Pat. No. 6,342,622) than that obtained from the comparative Example 2A (38% for the present invention versus 24%). It is to be noted that the inclusion of the ligand recovery process of at least 1 cycle as described in the present invention enhances the yield to 38% compared to 30% without the ligand recovery/purification process. This is because the inventive process is designed for the ligand recovered to be added back to the process for metallocene complex synthesis. In particular as the present invention results in higher yield of intermediate products (59% versus 35%) as shown in Table 4, the overall yield of metallocene complex is also increased over existing process known in literature.

Further, from the experimental section it may be noted that the complexation reaction between zirconium tetrachloride and the second lithiated reaction product was conducted at reduced time frame (6 hours as described versus a two day period described in the U.S. Pat. No. 6,342,622), thereby making the inventive process more efficient and suitable for industrial scale production.

For the purpose of calculation, it may be noted that the overall yield is calculated by multiplying Yield % (I) with Yield % (II). The yield is calculated using the mole number (mol), which in turn is calculated by dividing the weight of the compound used with respective molecular weight. For example, for boronic acid used in Example 2A, the mole number is calculated by dividing 12.2 by 269.

EXAMPLE 3

Purpose: To demonstrate the dependence of conversion yield to the reaction time between zirconium tetrachloride and the second lithiated reaction product:

The table below gives a comparison of the conversion yield obtained when the reaction time between zirconium tetrachloride and the second lithiated reaction product was varied:

TABLE 5

| Conversion yield | | | |
|---|---|---|---|
| Example | Metallocene complex precursor | Time | Conversion yield (%) 2, 2'-bis (2-indenyl) biphenyl zirconium dichloride complex |
| 1 | 0.501 | 3 hours | 75% |
| 2 | 0.435 | 6 hours | >98% |
| 3 | 0.496 | 16 hours | 95% |

From the table it is evident that a purposeful selection of time period of reaction of at least 6 hours of reaction is particularly suited for obtaining high conversion yield to obtain the metallocene complex as observed by 1H NMR spectroscopy (Comparison of peak-area). The reduced reaction time with enhanced yield comparison is particularly useful for industrial scale preparation of metallocene ligands and complexes.

The invention claimed is:

1. A process comprising the steps, in this order:

a) providing a precursor mixture comprising (i) a biphenyl compound of formula (2)

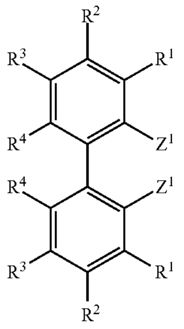

(2)

wherein, $R^1$, $R^2$, $R^3$, and $R^4$ are each independently selected from hydrogen, a halide, an alkyl group having one to twenty carbon atoms, an alkenyl group having one to twenty carbon atoms, an aryl group having one to twenty carbon atoms, an alkoxycarbonyl group having one to twenty carbon atoms, or an alkylaryl group having one to twenty carbon atoms; an alkylsulphide group having one to twenty carbon atoms, an alkoxy group having one to twenty carbon atoms, or an amine group; and wherein $Z^1$ is hydrogen; and (ii) a tertiary amine compound;

and b) adding at a temperature between 18° C. to 65° C., an alkyl and/or aryl lithium compound having one to ten carbon atoms, to the precursor mixture and forming a first lithiated reaction product;

and c) contacting the first lithiated reaction product with a boronate ester compound of formula (3)

$$B(OR^{11})_3 \quad (3)$$

and obtaining a boronate reaction product; wherein $R^{11}$ is independently selected from hydrogen, an alkyl group having one to twenty carbon atoms, an alkenyl group having one to twenty carbon atoms, an aryl group having one to twenty carbon atoms, an alkoxycarbonyl group having one to twenty carbon atoms, or an alkylaryl group having one to twenty carbon atoms;

and d) hydrolyzing the boronate reaction product and forming the boronic anhydride compound of formula (1)

(1)

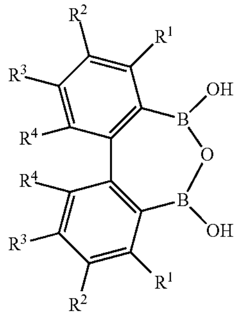

wherein $R^1$, $R^2$, $R^3$, and $R^4$ are each independently selected from hydrogen, a halide, an alkyl group having one to twenty carbon atoms, an alkenyl group having one to twenty carbon atoms, an aryl group having one to twenty carbon atoms, or an alkylaryl group having one to twenty carbon atoms; an alkylsulphide group having one to twenty carbon atoms, an alkoxy group having one to twenty carbon atoms, or an amine group; and 'B' stands for the element boron;

and e) reacting the boronic anhydride compound of formula (1) with a 2-bromo indenyl of formula (6)

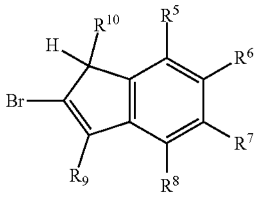

wherein $R^5$, $R^6$, $R^7$, $R^8$, $R^9$ and $R^{10}$ are each independently selected from hydrogen, a halide, an alkyl group having one to twenty carbon atoms, an alkenyl group having one to twenty carbon atoms, an aryl group having one to twenty carbon atoms, or an alkylaryl group having one to twenty carbon atoms; an alkylsulphide group having one to twenty carbon atoms, an alkoxy group having one to twenty carbon atoms, or an amine group, in the presence of a palladium catalyst and forming a metallocene complex precursor of formula (7), (7)

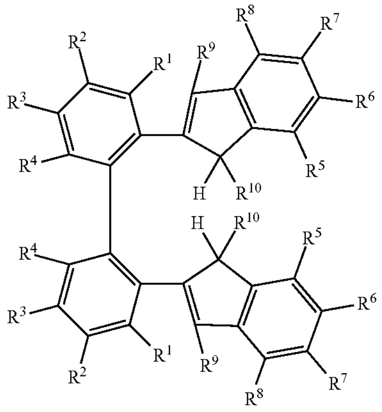

wherein, $R^1$ to $R^{10}$ are as defined herein;

and f) reacting the metallocene complex precursor of formula (7) with the alkyl and/or aryl lithium compound having one to ten carbon atoms, and forming a second lithiated reaction product;

and g) reacting for a time period ranging from 4 to 10 hours, the second lithiated reaction product with a transition metal compound of formula (8), $$MQ_p \quad (8)$$

wherein, 'M' is a transition metal element selected from Group 3, 4, or 5 of the Periodic System of Elements, 'Q' is an halide anion, and 'P' is the valency of the transition metal element 'M' and indicates the number of halide anion present, and forming a reaction mixture comprising a metallocene complex of formula (4), (4)

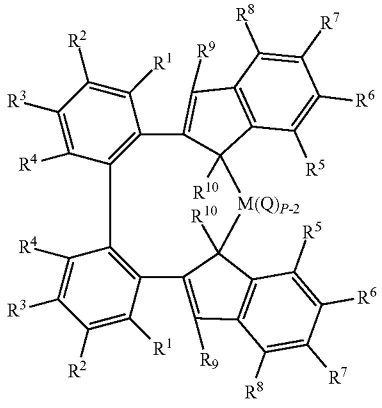

wherein, $R^1$ to $R^{10}$, 'M', 'Q' and 'P' are as defined herein;

and h) purifying the reaction mixture comprising the metallocene complex of formula (4), by solvent extraction and filtration, and obtaining (i) a purified metallocene ligand of formula (4a), (4a)

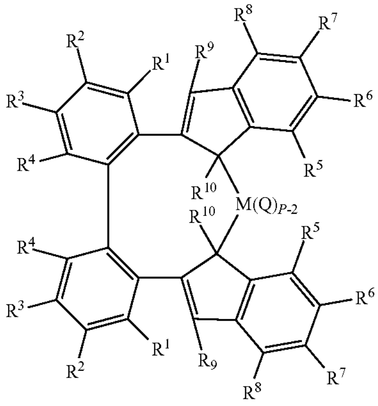

wherein, $R^1$ to $R^{10}$, 'M', 'Q' and 'P' are as defined herein, and (ii) a product effluent comprising a mixture of metallocene complex of formula 4a, metallocene complex precursor of formula 7, partially complexed metallocene complex, and lithium based inorganic salts.

2. The process according to claim 1, wherein the tertiary amine compound is tetramethylethylene diamine (TMEDA).

3. The process according to claim 1, wherein the alkyl and/or aryl lithium compound is butyl lithium.

4. The process according to claim 1, wherein the tertiary amine compound is a bidentate tertiary amine.

5. The process according to claim 1, wherein the transition metal element 'M' is selected from zirconium, hafnium, or titanium.

6. The process according to claim 1, wherein the transition metal element 'M' is zirconium.

7. The process according to claim 1, wherein the transition metal compound of formula (8) is zirconium tetrachloride ($ZrCl_4$).

8. The process according to claim 1, wherein the alkyl and/or aryl lithium compound is selected from methyl lithium, butyl lithium, or phenyl lithium.

9. The process according to claim 1, comprising adding at a temperature between 21° C. to 45° C., the alkyl and/or aryl lithium compound having one to ten carbon atoms, to the precursor mixture and forming the first lithiated reaction product.

10. The process according to claim 1, comprising adding at a temperature between 25° C. to 35° C., the alkyl and/or aryl lithium compound having one to ten carbon atoms, to the precursor mixture and forming the first lithiated reaction product.

11. The process according to claim 1, wherein forming the boronic anhydride compound of formula (1) is conducted at 20° C.-25° C.

* * * * *